United States Patent
Mitsui et al.

(10) Patent No.: US 11,262,290 B2
(45) Date of Patent: Mar. 1, 2022

(54) CORROSION SENSOR AND PRODUCTION METHOD FOR THE SAME

(71) Applicant: MITSUBISHI HEAVY INDUSTRIES, LTD., Tokyo (JP)

(72) Inventors: Hiroyuki Mitsui, Tokyo (JP); Ikumasa Koshiro, Tokyo (JP); Naoto Tagami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 204 days.

(21) Appl. No.: 16/434,423

(22) Filed: Jun. 7, 2019

(65) Prior Publication Data

US 2019/0391068 A1 Dec. 26, 2019

(30) Foreign Application Priority Data

Jun. 13, 2018 (JP) .............................. JP2018-112858

(51) Int. Cl.
*G01N 17/04* (2006.01)

(52) U.S. Cl.
CPC .................................... *G01N 17/04* (2013.01)

(58) Field of Classification Search
CPC . G01N 17/02–046; G01N 27/02; G01N 27/04
See application file for complete search history.

(56) References Cited

U.S. PATENT DOCUMENTS

| 6,391,173 B1 * | 5/2002 | Kim ..................... G01N 17/02 204/400 |
| 2011/0175633 A1 | 7/2011 | Dobashi et al. | |

FOREIGN PATENT DOCUMENTS

| JP | H0212649 U | * | 1/1990 |
| JP | 2002-071616 | | 3/2002 |
| JP | 2010-133750 | | 6/2010 |
| JP | 2016180687 A | * | 10/2016 |
| JP | 2017003419 A | * | 1/2017 |

* cited by examiner

*Primary Examiner* — Maris R Kessel
(74) *Attorney, Agent, or Firm* — Wenderoth, Lind & Ponack, L.L.P.

(57) ABSTRACT

A corrosion sensor includes an inner electrode formed of a conductive material, the inner electrode including a columnar portion around an axial line as a center thereof and of which an outer circumferential surface is tapered, wherein a diameter of the outer circumferential surface decreases toward one side in an axial direction, an outer electrode formed of a conductive material, the outer electrode including a cylindrical portion around the axial line and of which an inner circumferential surface is tapered, wherein a diameter of the inner circumferential surface decreases toward the one side in the axial direction, and the cylindrical portion is positioned such that the inner circumferential surface radially faces the outer circumferential surface, and an insulation layer formed of an insulation material and in a position across which the outer circumferential surface faces the inner circumferential surface.

7 Claims, 6 Drawing Sheets

CORROSION SENSOR AND PRODUCTION METHOD FOR THE SAME

CROSS-REFERENCE TO RELATED APPLICATION

Priority is claimed from Japanese Patent Application No. 2018-112858, filed on Jun. 13, 2018, the content of which is incorporated herein by reference.

BACKGROUND OF THE INVENTION

Field of the Invention

The present disclosure relates to a corrosion sensor and a production method for the same.

Description of Related Art

For example, some members of a gas turbine are formed of steel such as carbon steel. When carbon steel is used in an atmospheric environment, corrosion progresses and rust occurs on the surface, which may become a cause of various problems. For this reason, the corrosion rate is monitored by a corrosion sensor.

For example, Japanese Unexamined Patent Application, First Publication No. 2002-71616 discloses a corrosion sensor that has an outer electrode having a ring shape; an inner electrode disposed inside the outer electrode; and an insulation layer interposed between the outer electrode and the inner electrode. The outer electrode and the inner electrode are formed of the same material as that of a member to be monitored. The corrosion sensor is capable of detecting the corrosion rate by measuring impedance between the outer electrode and the inner electrode.

SUMMARY OF THE INVENTION

It is necessary to fill a narrow clearance between the outer electrode and the inner electrode with an insulation material such as resin when producing the corrosion sensor. At the time, if air bubbles remain in the resin, defects occur in the insulation layer, thereby causing a degradation in the quality of the corrosion sensor.

The present disclosure is made in light of such a situation, an object of the present disclosure is to provide a corrosion sensor and a production method for the same which are capable of improving quality and workability.

The present disclosure adopts the following means to solve the problem.

That is, according to one aspect of the present disclosure, a corrosion sensor includes: an inner electrode formed of a conductive material, including a columnar portion having a columnar shape around an axial line as a center thereof and of which an outer circumferential surface is tapered, wherein a diameter of the tapered outer circumferential surface of the columnar portion is gradually reduced as it moves toward one side in a direction of the axial line; an outer electrode formed of a conductive material, including a cylindrical portion having a cylindrical shape around the axial line as a center thereof and of which an inner circumferential surface is tapered, wherein a diameter of the tapered inner circumferential surface of the cylindrical portion is gradually reduced as it moves toward the one side in the direction of the axial line, and the cylindrical portion is provided such that the tapered inner circumferential surface radially faces the tapered outer circumferential surface; and an insulation layer formed of an insulation material and installed in a place across which the tapered outer circumferential surface faces the tapered inner circumferential surface.

In the corrosion sensor, when the inner electrode and the outer electrode are assembled together, the inner electrode is inserted inside the tapered inner circumferential surface of the outer electrode in a state where at least one of the tapered inner circumferential surface and the tapered outer circumferential surface are coated with the insulation material. At the time, since the tapered inner circumferential surface and the tapered outer circumferential surface face each other, a contact pressure can be exerted as a load onto the insulation material between the tapered inner circumferential surface and the tapered outer circumferential surface by both of the tapered inner circumferential surface and the tapered outer circumferential surface. Therefore, it is possible to remove air from the insulation material owing to the load while being capable of easily filling the narrow area between the tapered inner circumferential surface and the tapered outer circumferential surface with the insulation material.

In the corrosion sensor, the insulation material may contain at least one of a glass material and a ceramic material.

Therefore, it is possible to obtain the insulation layer withstanding a higher temperature environment, compared to when the insulation layer is formed of resin such as epoxy resin as an insulation material. In addition, since after the inner electrode and the outer electrode are assembled together, the inner electrode and the outer electrode are heated and the insulation material is melted, it is possible to improve adhesion among the inner electrode, the outer electrode, and the insulation layer.

In the corrosion sensor, the insulation layer may include a first layer on the tapered outer circumferential surface, and a second layer on the tapered inner circumferential surface, and a first insulation material forming the first layer may differ from a second insulation material forming the second layer.

Since the insulation layer has the first layer and the second layer formed of different insulation materials, for example, even if one layer deteriorates due to a usage environment, it is possible to insulate the inner electrode from the outer electrode owing to the other layer.

In the corrosion sensor, the inner electrode may further include an inside flange portion protruding radially outward from the columnar portion, the outer electrode may further include an outside flange portion protruding radially outward from the cylindrical portion, and facing the inside flange portion from the one side in the axial line direction, and the corrosion sensor may further include a spacer bring into contact with the inside flange portion and the outside flange portion.

It is possible to easily adjust the distance between the inner electrode and the outer electrode, that is, the thickness of the insulation layer by adjusting the dimension of the spacer.

In the corrosion sensor, the columnar portion may have a recessed portion formed to be recessed from a surface of the columnar portion on the other side in the direction of the axial line, and an inner circumferential surface of the recessed portion may be positioned inside the tapered outer circumferential surface in a radial direction of the columnar portion.

Therefore, even if the corrosion sensor is used in a high-temperature environment, it is possible to reduce the thermal stress of the inner electrode.

After the inner electrode and the outer electrode are assembled together, when the first and second insulation materials are melt-bonded together by heating the inner electrode and the outer electrode, gas such as hydrogen may be generated from the insulation materials. If the gas remains in the insulation layer, the gas may cause defects. In the aspect, since the inner circumferential surface of the recessed portion is positioned inside the tapered outer circumferential surface, hydrogen penetrating into the inner electrode through the tapered outer circumferential surface is discharged outward through the recessed portion. Therefore, it is possible to prevent gas from remaining in the insulation layer.

According to another aspect of the present disclosure, a production method for a corrosion sensor includes: an inner electrode preparation step of preparing an inner electrode formed of a conductive material, including a columnar portion having a columnar shape around an axial line as a center thereof and of which an outer circumferential surface is tapered, wherein a diameter of the tapered outer circumferential surface of the columnar portion is gradually reduced as it moves toward one side in a direction of the axial line; an outer electrode preparation step of preparing an outer electrode formed of a conductive material, including a cylindrical portion having a cylindrical shape around the axial line as a center thereof and of which an inner circumferential surface is tapered, wherein a diameter of the tapered inner circumferential surface is gradually reduced as it moves toward the one side in the direction of the axial line, and the cylindrical portion is provided such that the tapered inner circumferential surface radially faces the tapered outer circumferential surface of the columnar portion; an insulation material coating step of coating at least one of the tapered outer circumferential surface and the tapered inner circumferential surface with an insulation material to form an insulation film; and an assembly step of assembling together the inner electrode and the outer electrode such that the tapered outer circumferential surface and the tapered inner circumferential surface face each other, after the insulation material coating step.

In the production method for a corrosion sensor, it is possible to easily fill the narrow clearance between the inner electrode and the outer electrode with the insulation material. In addition, when the inner electrode and the outer electrode are assembled together, a contact pressure can be exerted as a load onto the insulation material between the tapered inner circumferential surface and the tapered outer circumferential surface by both of the tapered inner circumferential surface and the tapered outer circumferential surface. Therefore, it is possible to remove air from the insulation material owing to the load while being capable of easily filling the narrow area between the tapered inner circumferential surface and the tapered outer circumferential surface with the insulation material.

In the production method for a corrosion sensor, the insulation material may contain at least one of a glass material and a ceramic material.

Therefore, it is possible to realize an insulation layer having good heat-resisting properties, compared to when the insulation layer is formed of resin.

Since the insulation material has good heat-resisting properties, the insulation material can be remelted by being heated. Therefore, it is possible to improve adhesion among the inner electrode, the outer electrode, and the insulation layer.

In the insulation material coating step of the production method for a corrosion sensor, the tapered outer circumferential surface and the tapered inner circumferential surface may be respectively coated with first and second insulation materials different from each other.

Therefore, for example, even if one insulation layer formed of one of the first and second insulation materials deteriorates due to a usage environment, it is possible to insulate the inner electrode from the outer electrode owing to the other insulation layer formed of the other of the first and second insulation materials.

In the production method for a corrosion sensor, the inner electrode may further include an inside flange portion protruding radially outward from the columnar portion, the outer electrode may further include an outside flange portion protruding radially outward from the cylindrical portion, and in the assembly step, the inner electrode and the outer electrode may be assembled together in a state where a spacer is interposed between the inside flange portion and the outside flange portion.

It is possible to easily adjust the distance between the inner electrode and the outer electrode, that is, the thickness of the insulation layer, by adjusting the dimension of the spacer which is interposed between the inside flange portion and the outside flange portion.

In the production method for a corrosion sensor, outer circumferential surfaces of the inside flange portion and the outside flange portion may have a circular cross section perpendicular to the axial line, and have the same outer diameter, and in the assembly step, while a guiding tool is used which has a cylindrical shape, and an inner circumferential surface of which serves as a guide surface having an inner diameter corresponding to outer diameters of the outer circumferential surfaces of the inside flange portion and the outside flange portion, and at least one of the inside flange portion and the outside flange portion is guided in the axial line direction by the guide surface, the inner electrode and the outer electrode may be assembled together.

Therefore, it is possible to align an axis of the inner electrode with that of the outer electrode, and to easily form the insulation layer having a uniform thickness over the entire area in the circumferential direction.

The production method for a corrosion sensor may further include a heating step of heating the insulation material at a temperature where the insulation material is melted after the assembly step.

Therefore, it is possible to improve adhesion among the inner electrode, the outer electrode, and the insulation layer by remelting the insulation material.

The corrosion sensor and the production method for the same of the present disclosure are capable of improving quality and workability.

DETAILED DESCRIPTION OF THE INVENTION

First Embodiment

Figure 1:
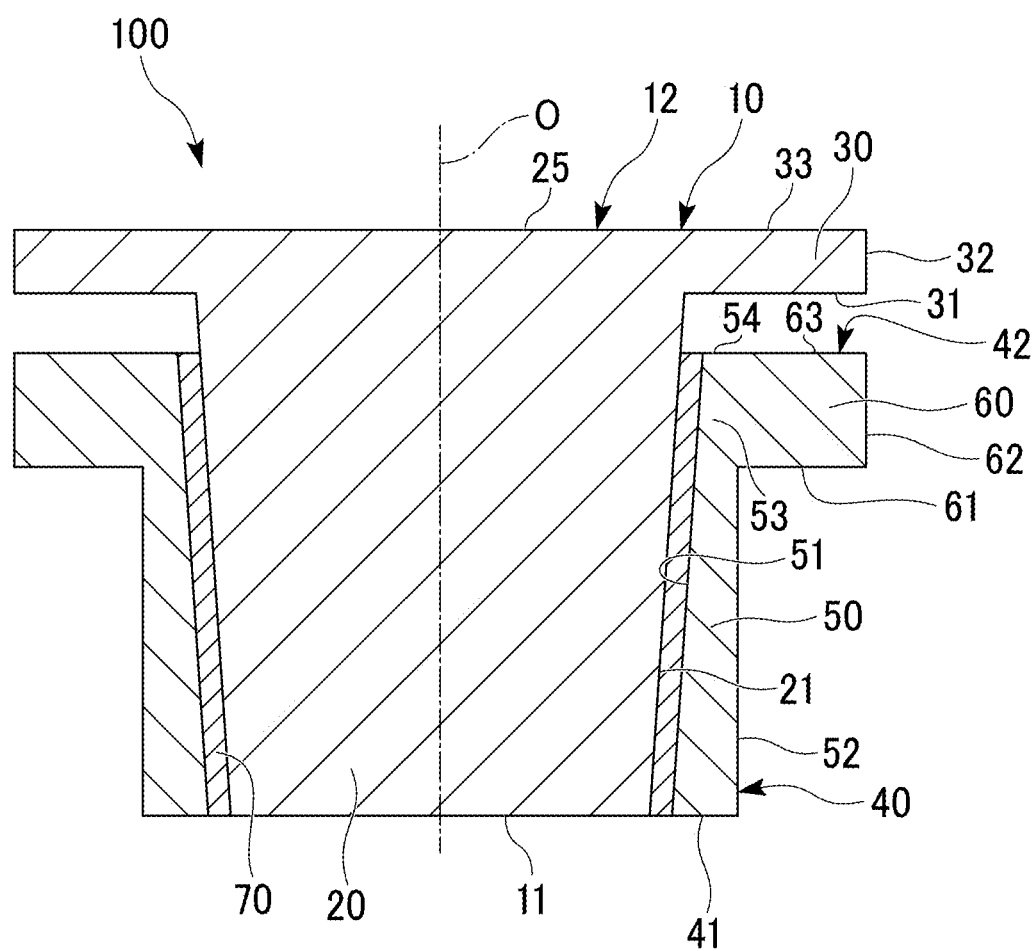
FIG. 1 is a longitudinal cross-sectional view of a corrosion sensor in a first embodiment.
Figure 2:
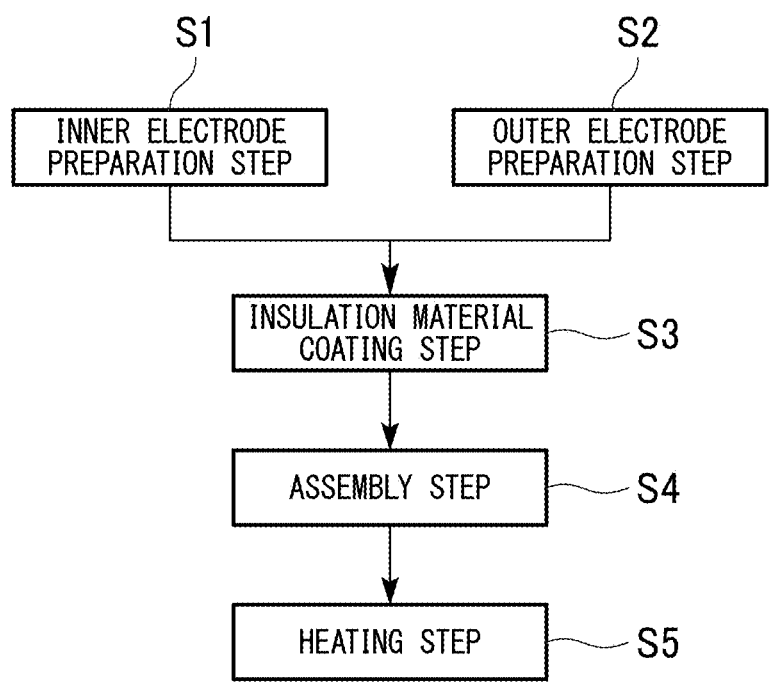
FIG. 2 is a flowchart showing the sequence of a production method for the corrosion sensor in the first embodiment.

A corrosion sensor 100 of a first embodiment of the present disclosure will be described in detail with reference to FIGS. 1 to 3. As illustrated in FIG. 1, the corrosion sensor 100 has an inner electrode 10; an outer electrode 40; and an insulation layer 70.

Inner Electrode

The inner electrode 10 is formed of the same material as that of a machine to be monitored. The inner electrode 10 of the embodiment is formed of metal, for example, steel such as carbon steel, aluminum, copper, or zinc. The inner electrode 10 has a columnar portion 20 and an inside flange portion 30.

The columnar portion 20 has a columnar shape around an axial line O as the center thereof. That is, the columnar portion 20 has the axial line O as the center thereof, and extends in a direction (direction of the axial line O) of the axial line O. The outer circumferential surface of the columnar portion 20 has a circular cross section perpendicular to the axial line O. The outer circumferential surface of the columnar portion 20 is a tapered outer circumferential surface 21, the diameter of which is gradually reduced as it moves toward one side (lower side in FIG. 1) in the direction of the axial line O. A first inside end surface 11 is an end surface of the columnar portion 20 on one side in the direction of the axial line O, that is, an end surface of the inner electrode 10 on one side in the direction of the axial line O. The first inside end surface 11 is a flat surface perpendicular to the axial line O.

The inside flange portion 30 protrudes radially outward from an end portion of the columnar portion 20, which is positioned on the other side (upper side in FIG. 1) in the direction of the axial line O. That is, the inside flange portion 30 is formed over the entire area in a circumferential direction with respect to the axial line O. An inside flange surface 31 is a surface of the inside flange portion 30, which faces one side in the direction of the axial line O.

An end surface 33 of the inside flange portion 30 on the other side in the direction of the axial line O is flush with an end surface 25 of the columnar portion 20 on the other side in the direction of the axial line O. A second inside end surface 12 is formed by the end surface 33 of the inside flange portion 30 on the other side in the direction of the axial line O and the end surface 25 of the columnar portion 20 on the other side in the direction of the axial line O. The second inside end surface 12 is an end surface of the inner electrode 10 on the other side in the direction of the axial line O. The second inside end surface 12 is a flat surface perpendicular to the axial line O.

An inside-flange outer circumferential surface 32 is an outer circumferential surface of the inside flange portion 30, and is a cylindrical surface which has the axial line O as the center thereof and is parallel to the axial line O. The cross section of the inside-flange outer circumferential surface 32, which is perpendicular to the axial line O, has a circular shape which is uniform in the direction of the axial line O and has the axial line O as the center thereof.

Outer Electrode

The outer electrode 40 is formed of the same material as that of the machine to be monitored. That is, similar to the inner electrode 10, the outer electrode 40 is formed of metal, for example, steel such as carbon steel, aluminum, copper, or zinc. The outer electrode 40 has a cylindrical portion 50, and an outside flange portion 60.

The cylindrical portion 50 has a cylindrical shape around the axial line O as the center thereof. That is, the cylindrical portion 50 has the axial line O as the center thereof, and extends in the direction (direction of the axial line O) of the axial line O. The inner circumferential surface of the cylindrical portion 50 has a circular cross section perpendicular to the axial line O. The inner circumferential surface of the cylindrical portion 50 is a tapered inner circumferential surface 51, the diameter of which is gradually reduced as it moves toward one side in the direction of the axial line O. In the embodiment, the tapered inner circumferential surface 51 has the same taper rate as that of the tapered outer circumferential surface 21. A first outside end surface 41 is an end surface of the cylindrical portion 50 on one side in the direction of the axial line O, that is, an end surface of the outer electrode 40 on one side in the direction of the axial line O. The first outside end surface 41 is a flat surface perpendicular to the axial line O.

An outer circumferential surface 52 of the cylindrical portion 50 is a cylindrical surface which has the axial line O as the center thereof and is parallel to the axial line O.

The outside flange portion 60 protrudes radially outward from an end portion 53 of the cylindrical portion 50, which is positioned on the other side in the direction of the axial line O. That is, the outside flange portion 60 is formed over the entire area in the direction of the axial line O. An outside flange surface 61 is a surface of the outside flange portion 60, which faces one side in the direction of the axial line O.

An end surface 63 of the outside flange portion 60 on the other side in the direction of the axial line O is flush with an end surface 54 of the cylindrical portion 50 on the other side in the direction of the axial line O. A second outside end surface 42 is formed by the end surface 63 of the outside flange portion 60 on the other side in the direction of the axial line O and the end surface 54 of the cylindrical portion 50 on the other side in the direction of the axial line O. The second outside end surface 42 is an end surface of the outer electrode 40 on the other side in the direction of the axial line O. The second outside end surface 42 is a flat surface perpendicular to the axial line O.

An outside-flange outer circumferential surface 62 is an outer circumferential surface of the outside flange portion 60, and is a cylindrical surface which has the axial line O as the center thereof and is parallel to the axial line O. The cross section of the outside-flange outer circumferential surface 62, which is perpendicular to the axial line O, has a circular shape which is uniform in the direction of the axial line O and has the axial line O as the center thereof. The outside-flange outer circumferential surface 62 has the same outer diameter as that of the inside-flange outer circumferential surface 32.

The columnar portion 20 of the inner electrode 10 is disposed inside the cylindrical portion 50 of the outer electrode 40. Therefore, the tapered outer circumferential surface 21 of the inner electrode 10 and the tapered inner circumferential surface 51 of the outer electrode 40 radially face each other over the entire area in the circumferential direction. The tapered outer circumferential surface 21 and the tapered inner circumferential surface 51 face each other in a state where a uniform clearance is formed therebetween over the entire area in the circumferential direction and in the direction of the axial line O.

The first outside end surface 41 of the outer electrode 40 is flush with the first inside end surface 11 of the inner electrode 10. The second outside end surface 42 of the outer electrode 40 and the inside flange surface 31 of the inner electrode 10 are disposed in a state where a clearance is formed therebetween in the direction of the axial line O. The second outside end surface 42 of the outer electrode 40 and the inside flange surface 31 of the inner electrode 10 are disposed such that a clearance is formed therebetween in the direction of the axial line O. The second outside end surface 42 of the outer electrode 40 is parallel to the inside flange surface 31 of the inner electrode 10. The outside-flange outer circumferential surface 62 of the outer electrode 40 and the inside-flange outer circumferential surface 32 of the inner electrode 10 are positioned on the same cylindrical surface having the axial line O as the center thereof.

Insulation Layer

The insulation layer 70 is provided in the clearance between the tapered outer circumferential surface 21 of the inner electrode 10 and the tapered inner circumferential surface 51 of the outer electrode 40, that is, in a place across which the tapered outer circumferential surface 21 faces the tapered inner circumferential surface 51. The insulation layer 70 is formed of an insulation material such as glass material or a ceramic material. The insulation layer 70 is disposed between the tapered outer circumferential surface 21 of the inner electrode 10 and the tapered inner circumferential surface 51 of the outer electrode 40, specifically, over the entire area in the circumferential direction and over the entire area of the tapered inner circumferential surface 51 in the direction of the axial line O.

That is, the entire area, across which the tapered outer circumferential surface 21 of the inner electrode 10 faces the tapered inner circumferential surface 51 of the outer electrode 40, is filled with the insulation layer 70. A portion of the tapered outer circumferential surface 21 of the inner electrode 10 on the other side in the direction of the axial line O does not face the tapered inner circumferential surface 51 of the outer electrode 40. Therefore, the insulation layer 70 is not provided in the portion.

A space between the inside flange surface 31 and the second outside end surface 42 may be filled with the insulation layer 70.

Production Method for Corrosion Sensor

Next, a production method for the corrosion sensor 100 with the configuration will be described. As illustrated in FIG. 2, the production method for the corrosion sensor 100 of the embodiment includes an inner electrode preparation step S1; an outer electrode preparation step S2; an insulation material coating step S3; an assembly step S4; and a heating step S5.

In the inner electrode preparation step S1, the inner electrode 10 is prepared. The inner electrode 10 is formed by cutting steel or the like.

In the outer electrode preparation step S2, the outer electrode 40 is prepared. The outer electrode 40 is formed by cutting steel or the like.

The inner electrode 10 and the outer electrode 40 may be formed by other production methods.

The insulation material coating step S3 is performed after the inner electrode preparation step S1 and the outer electrode preparation step S2. In the insulation material coating step S3 of the embodiment, as illustrated in FIG. 3, an insulation film 71 is formed by coating both of the tapered outer circumferential surface 21 of the inner electrode 10 and the tapered inner circumferential surface 51 of the outer electrode 40 with an insulation paste containing an insulation material such as glass material or ceramic material. The insulation film 71 is formed by coating the tapered outer circumferential surface 21 and the tapered inner circumferential surface 51 with the insulation paste in a molten state, by drying and baking the coated tapered outer circumferential surface 21 and the coated tapered inner circumferential surface 51, and then by solidifying the coated tapered outer circumferential surface 21 and the coated tapered inner circumferential surface 51 through cooling. The insulation film 71 may not be in a solid state but in a semi-molten state. When a glass material or a ceramic material is used as the insulation material, a glass film or ceramic film is formed as the insulation film 71.

The process proceeds to the subsequent assembly step S4 in a state where in the insulation material coating step S3, the tapered outer circumferential surface 21 of the inner electrode 10 and the tapered inner circumferential surface 51 of the outer electrode 40 are dried after being coated with the insulation paste.

In the embodiment, the insulation film 71 is formed over the entire area of the tapered inner circumferential surface 51 of the outer electrode 40. In addition, the insulation film 71 is formed on the area of the tapered outer circumferential surface 21 of the inner electrode 10 except an upper portion of the tapered outer circumferential surface 21. A portion of the tapered outer circumferential surface 21, on which the insulation film 71 is formed, is an area across which the tapered outer circumferential surface 21 and the tapered inner circumferential surface 51 of the corrosion sensor 100 face each other.

The assembly step S4 is performed after the insulation material coating step S3. The assembly step S4 is a step of assembling together the inner electrode 10 and the outer electrode 40 such that the tapered outer circumferential surface 21 of the inner electrode 10 and the tapered inner circumferential surface 51 of the outer electrode 40 face each other.

Figure 3:
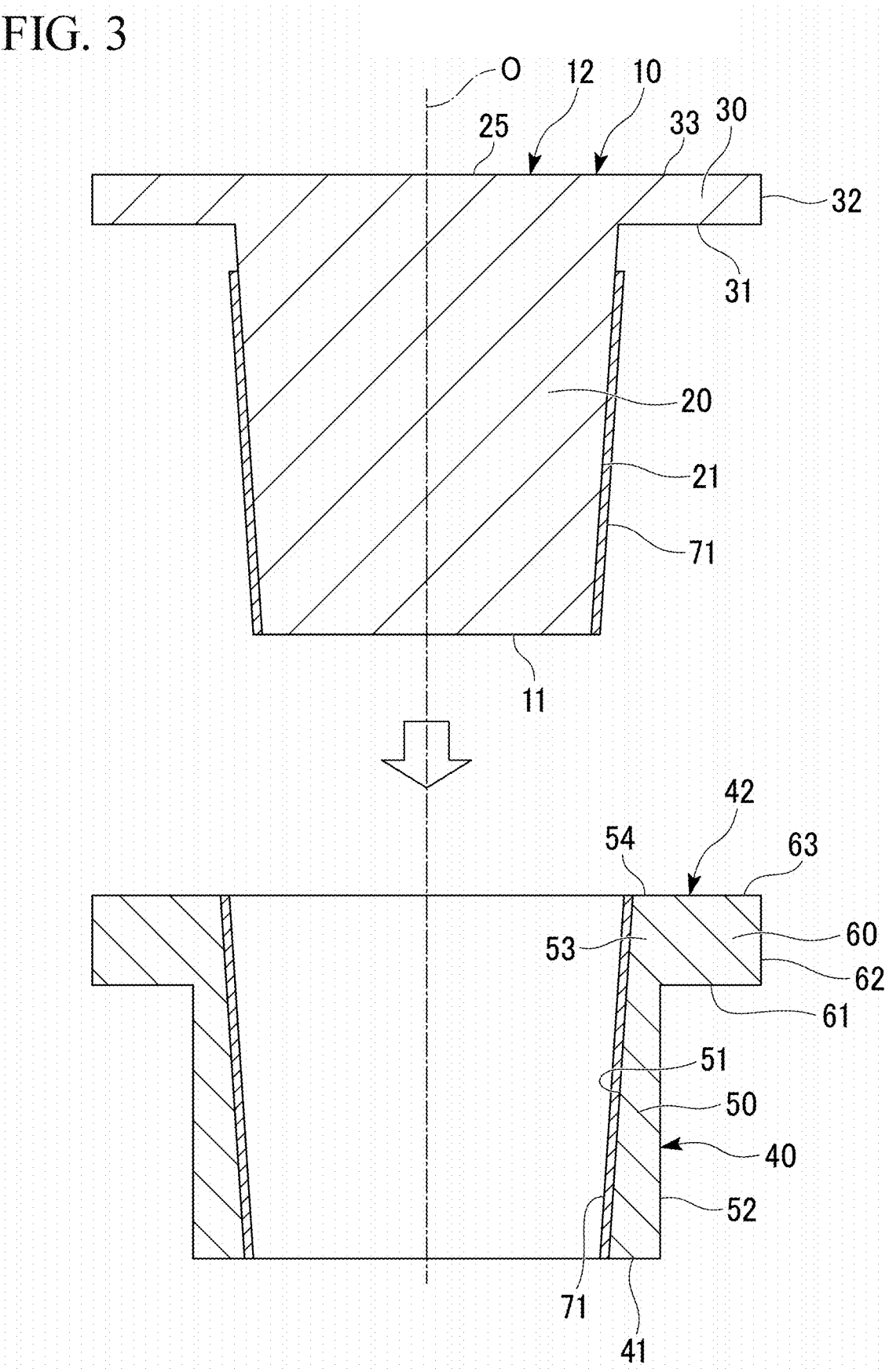
FIG. 3 is a view showing an assembly step in the production method for the corrosion sensor in the first embodiment.

More specifically, in the assembly step S4, as illustrated in FIG. 3, the inner electrode 10 is inserted into the outer electrode 40 through an end portion of the outer electrode 40 on the other side in the direction of the axial line O. At the time, the inner electrode 10 is inserted into the outer electrode 40 such that the outer electrode 40 is maintained coaxial with the inner electrode 10 and the taper direction of the tapered inner circumferential surface 51 of the outer electrode 40 coincides with that of the tapered outer circumferential surface 21 of the inner electrode 10.

In the assembly step S4 of the embodiment, the inner electrode 10 is inserted into the outer electrode 40 until the first outside end surface 41 of the outer electrode 40 is in the same position in the direction of the axial line O as that of the first inside end surface 11 of the inner electrode 10. Therefore, the insulation film 71 on the tapered inner circumferential surface 51 of the outer electrode 40 is in close contact with the insulation film 71 on the tapered outer circumferential surface 21 of the inner electrode 10. A contact pressure is exerted as a load onto the insulation films 71 by both of the tapered inside surface and the tapered outside surface.

The heating step S5 is performed after the assembly step S4. In the heating step S5, the inner electrode 10, the outer electrode 40, and the insulation films 71 integrated together in the assembly step S4 are heated. In the heating step S5, heating is performed at a temperature where the insulation films 71 become remelted. The insulation layer 70 is formed by melting the insulation films 71 through heating, and thereafter by solidifying the insulation films 71 through cooling. That is, the insulation layer 70 is formed between the tapered outer circumferential surface 21 and the tapered inner circumferential surface 51 by melt-bonding together the insulation films 71.

The corrosion sensor 100 of the embodiment illustrated in FIG. 1 can be obtained through the foregoing steps.

Effects

The corrosion sensor 100 is configured such that lead wires are electrically connected to the first inside end surface 11 of the inner electrode 10 and the first outside end surface 41 of the outer electrode 40. A measurement apparatus (not illustrated) measures impedance between the inner electrode 10 and the outer electrode 40 via the lead wires. It is possible to continually acquire the corrosion rate of the inner electrode 10 and the outer electrode 40 at any time by monitoring the impedance. Therefore, it is possible to know the corrosion rate of the corrosion sensor 100, and the corrosion rate of the machine placed in the same environment.

In the corrosion sensor 100 of the embodiment, when the inner electrode 10 and the outer electrode 40 are assembled together, the inner electrode 10 is inserted into the outer electrode 40 in a state where both of the tapered inner circumferential surface 51 and the tapered outer circumferential surface 21 are coated with the insulation material. At the time, since the tapered inner circumferential surface 51 and the tapered outer circumferential surface 21 face each other, a contact pressure can be exerted as a load onto the insulation films 71 between the tapered inner circumferential surface 51 and the tapered outer circumferential surface 21 by both of the tapered inner circumferential surface 51 and the tapered outer circumferential surface 21. Therefore, it is possible to remove air from the insulation films 71 or between the insulation films 71 owing to the load while being capable of easily filling the narrow area between the tapered inner circumferential surface 51 and the tapered outer circumferential surface 21 with the insulation material.

In assembling the inner electrode 10 and the outer electrode 40 together, after a clearance therebetween is formed, when the clearance is filled with the insulation material, it is not easy to uniformly apply the insulation material to the narrow clearance without allowing air to remain therein. In the embodiment, since the inner electrode 10 and the outer electrode 40 are coated with the insulation material before being assembled together, and thereafter the inner electrode 10 is taper fitted into the outer electrode 40, it is possible to easily and very accurately form the insulation films 71 exhibiting good insulation performance.

Therefore, it is possible to improve a production yield of the corrosion sensor 100. In addition, it is possible to reduce production costs as a result of being capable of shortening an operation step time. It is possible to stably produce the corrosion sensor 100 with high quality. Therefore, it is possible to improve the reliability of the corrosion sensor 100.

It is possible to set the thickness of the insulation layer 70 to any given value by pre-adjusting the dimensions of the inner electrode 10 and the outer electrode 40. Therefore, it is possible to form the insulation layer 70 having, for example, a thickness of less than or equal to 0.1 mm. It is difficult to realize the insulation layer 70 with such a thickness using a technique of pre-forming a clearance and filling the clearance with an insulation material as in the related art. In the production method for the corrosion sensor 100 of the embodiment, since the inner electrode 10 and the outer electrode 40 are pre-coated with the insulation material, it is possible to easily and very accurately realize the insulation layer 70 having a very small thickness.

In the embodiment, a glass material or a ceramic material is used as the insulation material. Therefore, it is possible to obtain the insulation layer 70 withstanding a higher temperature environment, compared to when the insulation layer 70 is formed of resin such as epoxy resin as an insulation material. In addition, since after the inner electrode 10 and the outer electrode 40 are assembled together, the inner electrode 10 and the outer electrode 40 are heated and the insulation material is melted, it is possible to improve adhesion among the inner electrode 10, the outer electrode 40, and the insulation layer 70.

Second Embodiment

Figure 4:
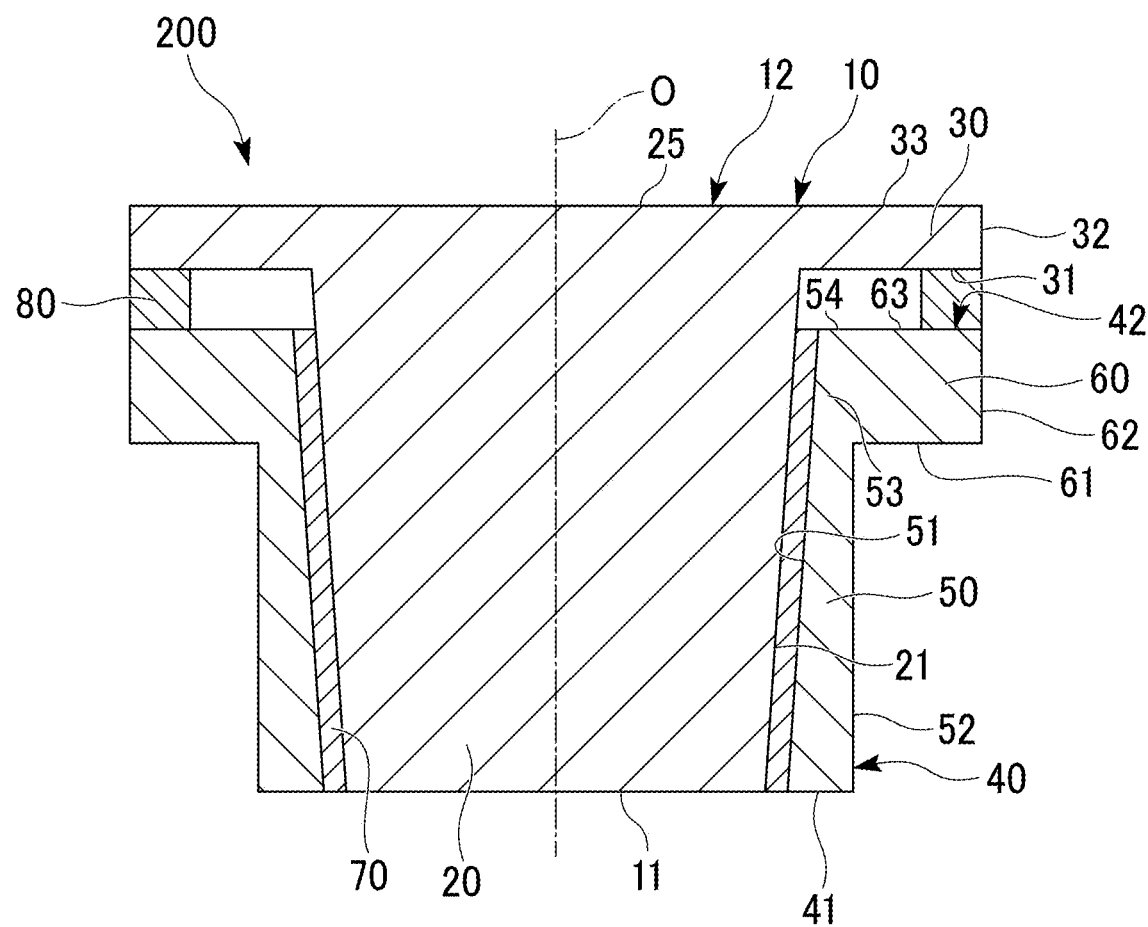
FIG. 4 is a longitudinal cross-sectional view of a corrosion sensor in a second embodiment.

Next, a second embodiment of the present disclosure will be described with reference to FIGS. 4 and 5. In the second embodiment, the same reference signs will be assigned to the same configuration elements as those in the first embodiment, and detailed descriptions thereof will be omitted. As illustrated in FIG. 4, a corrosion sensor 200 of the second embodiment has a spacer 80 in addition to the configuration elements of the first embodiment.

Spacer

The spacer 80 is a ring-shaped member that surrounds the axial line O. The spacer 80 is formed of an insulation material such as ceramics. The spacer 80 is interposed between the inside flange surface 31 of the inner electrode 10 and the second outside end surface 42 of the outer electrode 40 over the entire area in the circumferential direction. The thickness of the spacer 80 is the dimension of the spacer 80 in the direction of the axial line O, and is uniform in the circumferential direction. The spacer 80 is ring-shaped in such a manner that the spacer is divided into several pieces in the circumferential direction, and the divided spacer pieces are arranged in the circumferential direction.

The spacer 80 may have a C shape formed by halving a ring. The spacer 80 may be formed of two poles of the same height.

In the embodiment, the outer circumferential surface of the spacer 80 has a circular shape having the axial line O as the center thereof. The outer diameter of the outer circumferential surface of the spacer 80 is the same as those of the inside-flange outer circumferential surface 32 and the outside-flange outer circumferential surface 62, or is smaller in a radially inward direction than those of the inside-flange outer circumferential surface 32 and the outside-flange outer circumferential surface 62.

Next, a production method for the corrosion sensor 200 in the second embodiment will be described. The production method for the corrosion sensor 200 in the second embodiment differs in the assembly step S4 from that for the corrosion sensor 100 in the first embodiment.

Figure 5:
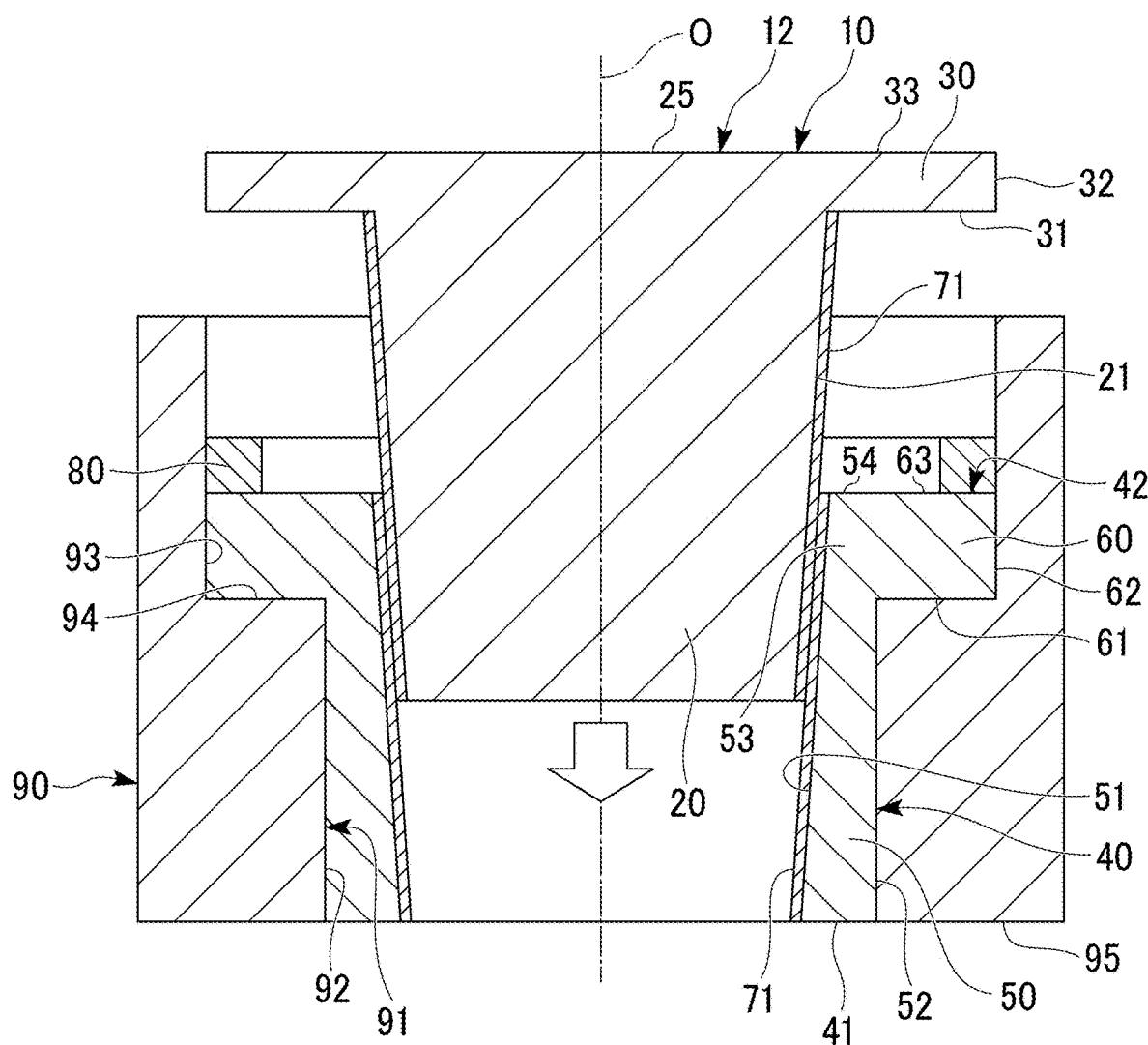
FIG. 5 is a view showing an assembly step in a production method for the corrosion sensor in the second embodiment.

As illustrated in FIG. 5, in the assembly step S4 of the second embodiment, a guiding tool 90 is used. The guiding tool 90 is formed of the same material as those of the inner electrode 10 and the outer electrode 40, or a material having a linear expansion coefficient greater than those of the inner electrode 10 and the outer electrode 40. The guiding tool 90 has a cylindrical shape having the axial line O as the center thereof. An inner circumferential surface 91 of the guiding tool 90 has a first inner circumferential surface 92 positioned on one side in the direction of the axial line O, and a second inner circumferential surface 93 serving as a guide surface positioned on the other side in the direction of the axial line O.

The first inner circumferential surface 92 has an inner diameter less than that of the second inner circumferential surface 93. The first inner circumferential surface 92 has the same inner diameter as that of the outer circumferential surface 52 of the cylindrical portion 50 of the outer electrode 40. The second inner circumferential surface 93 has the same inner diameter as the outer diameter of the inside-flange outer circumferential surface 32 of the inner electrode 10, and the outer diameter of the outside-flange outer circumferential surface 62 of the outer electrode 40. A stepped portion between the first inner circumferential surface 92 and the second inner circumferential surface 93 is a flat surface perpendicular to the axial line O, and is a stepped surface 94 that faces the other side in the direction of the axial line O.

The assembly step S4 of the second embodiment is performed in a state where the direction of the axial line O of the inner electrode 10, the outer electrode 40, and the guiding tool 90 coincides with a vertical direction. One side in the direction of the axial line O becomes a lower side, and the other side in the direction of the axial line O becomes an upper side.

Firstly, the outer electrode 40, on which the insulation film 71 is formed, is inserted from above into the guiding tool 90 disposed extending in the vertical direction, and the outer electrode 40 is installed inside the guiding tool 90. At the time, the outer circumferential surface 52 of the cylindrical portion 50 of the outer electrode 40 comes into contact with the first inner circumferential surface 92 of the guiding tool 90, and the outside-flange outer circumferential surface 62 of the outer electrode 40 comes into contact with the second inner circumferential surface 93. Therefore, the central axis line of the outer electrode 40 coincides with the central axis line of the guiding tool 90. In addition, since the outside flange surface 61 of the outer electrode 40 comes into contact with the stepped surface 94, the outer electrode 40 is located in the direction of the axial line O. The first outside end surface 41 may be flush with a lower surface 95 of the guiding tool 90, but it is necessary to design the guiding tool 90 such that the lower surface 95 is positioned lower than the first outside end surface 41.

Subsequently, the spacer 80 is installed on the second outside end surface 42, which is an upper surface of the outer electrode 40. Thereafter, similar to the first embodiment, the inner electrode 10, on which the insulation film 71 is formed, is inserted from above into the outer electrode 40. In a condition where the inner electrode 10 is inserted enough to be positioned inside the outer electrode 40, the inside-flange outer circumferential surface 32 of the inner electrode 10 comes into contact with the second inner circumferential surface 93 of the guiding tool 90 over the entire area in the circumferential direction. The inner electrode 10 is guided downward by the second inner circumferential surface 93 in a state where the central axis line of the inner electrode 10 coincides with that of the guiding tool 90. That is, the inner electrode 10 is guided downward in a state where the guiding tool 90 is maintained coaxial with the outer electrode 40.

The insertion of the inner electrode 10 is stopped in a stage where the inside flange surface 31 of the inner electrode 10 comes into contact with an upper surface of the spacer 80. Alternatively, even before the inside flange surface 31 comes into contact with the spacer 80, depending on the thicknesses of the insulation films 71, the insertion of the inner electrode 10 is stopped when the insulation film 71 of the inner electrode 10 comes into contact with the insulation film 71 of the outer electrode 40.

Since the heating step S5 is performed after the assembly step S4, the insulation films 71 are melted, and the insulation layer 70 is formed. When the inside flange surface 31 of the inner electrode 10 is not in contact with the spacer 80, when the insulation films 71 become melted in the heating step S5, the inner electrode 10 is further inserted into the outer electrode 40 owing to the weight of the inner electrode 10. The inner electrode 10 stops moving relative to the outer electrode 40 in a stage where the inside flange surface 31 of the inner electrode 10 comes into contact with the spacer 80.

In the heating step S5, load-exerting means such as heavy weight for exerting a downward load onto the inner electrode 10 may be used. Therefore, it is possible to melt the insulation films 71 while pressing the inner electrode 10 downward.

It is possible to obtain the corrosion sensor 200 of the embodiment by detaching the guiding tool 90 after the heating step S5. In this stage, the spacer 80 may be removed from the corrosion sensor 200 by detaching the plurality of divided spacer pieces to an outer circumference side. In addition, when the first inside end surface 11 and the first outside end surface 41, which are lower ends, are not flush with each other due to the position of the first inside end surface 11 not being aligned with that of the first outside end surface 41 in the direction of the axial line O, an end surface of the corrosion sensor 200 may be formed as a flush surface by cutting a lower portion of the corrosion sensor 200 along a plane perpendicular to the axial line O.

In the embodiment, it is possible to easily and very accurately adjust the distance between the inner electrode 10 and the outer electrode 40, that is, the thickness of the insulation layer 70 by adjusting the dimension of the spacer 80 in the direction of the axial line O which is interposed between the inside flange portion 30 and the outside flange portion 60.

In addition, it is possible to align an axis of the inner electrode 10 with that of the outer electrode 40, and to easily form the insulation layer 70 having a uniform thickness over the entire area in the circumferential direction by using the guiding tool 90 in the assembly step S4.

Third Embodiment

Figure 6:
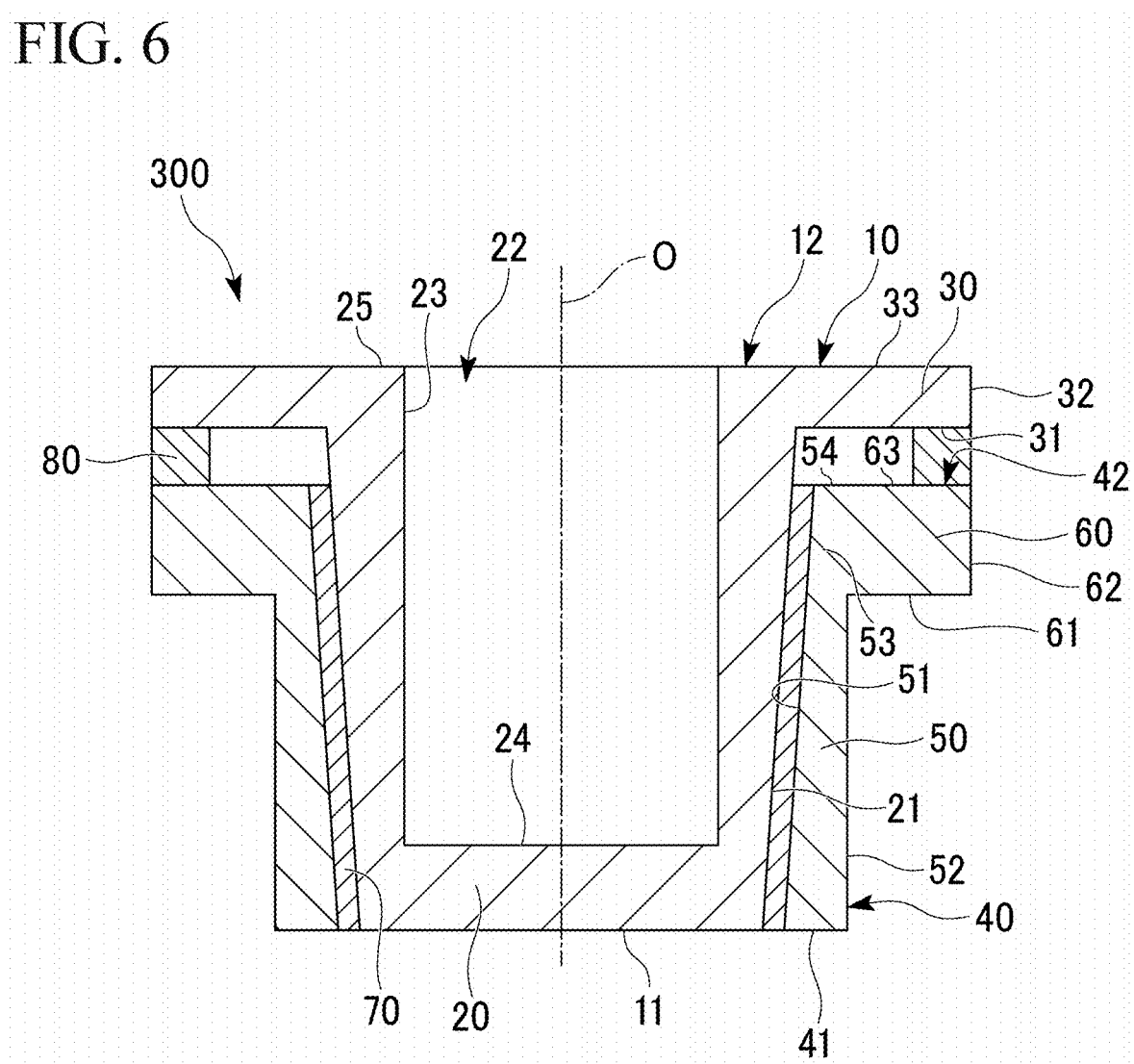
FIG. 6 is a longitudinal cross-sectional view of a corrosion sensor in a third embodiment.

Next, a third embodiment of the present disclosure will be described with reference to FIG. 6. In the third embodiment, the same reference signs will be assigned to the same configuration elements as those in the first and second embodiments, and detailed descriptions thereof will be omitted.

In a corrosion sensor 300 of the third embodiment, a recessed portion 22 is formed in the columnar portion 20 of the inner electrode 10, and is recessed toward one side in the direction of the axial line O from the second inside end surface 12 which is the end surface of the inner electrode 10 on the other side in the direction of the axial line O.

An inner circumferential surface 23 of the recessed portion 22 has a circular shape having the axial line O as the center thereof, and has an inner diameter uniform in the direction of the axial line O. A bottom surface 24 of the recessed portion 22 has a flat shape perpendicular to the axial line O. The inner circumferential surface 23 of the recessed portion 22 is positioned inside the tapered inner circumferential surface 51 in a radial direction. That is, the inner circumferential surface 23 of the recessed portion 22 is positioned on a back side of the tapered outer circumferential surface 21. The columnar portion 20 of the inner electrode 10 of the embodiment has a hollow structure formed by the recessed portion 22.

After the inner electrode 10 and the outer electrode 40 are assembled together, when the insulation films 71 are melt-bonded together by heating the inner electrode 10 and the outer electrode 40, gas such as hydrogen may be generated from the insulation material. If the gas remains in the insulation layer 70, the gas may cause defects. In the embodiment, since the inner circumferential surface 23 of the recessed portion 22 is positioned on the back side of the tapered outer circumferential surface 21, hydrogen penetrating into the inner electrode 10 through the tapered outer circumferential surface 21 is discharged outward through the recessed portion 22. That is, the gas is capable of diffusing to the center of the inner electrode 10, and escaping. Therefore, it is possible to prevent gas from remaining in the insulation layer 70, and to avoid the occurrence of defects.

In addition, since the inner electrode 10 has a hollow structure formed by the recessed portion 22, when in the heating step S5 the corrosion sensor 300 is used in a high-temperature environment, it is possible to reduce thermal stress occurring in the inner electrode 10.

The recessed portion 22 is not limited to the foregoing shape, but for example, a plurality of the recessed portions 22 may be formed in a state where clearances are formed therebetween in such a manner as to be positioned on the back side of the tapered outer circumferential surface 21. The same effects are realized by this configuration.

Other Embodiments

The embodiments of the present disclosure have been described above, but the present disclosure is not limited to the embodiments, and changes can be appropriately made to the disclosure without departing from the technical concept.

For example, the embodiments are not limited to having the configuration in which the insulation films 71 are formed on both of the tapered outer circumferential surface 21 of the inner electrode 10 and the tapered inner circumferential surface 51 of the outer electrode 40. The insulation film 71 may be formed on only one of either the tapered outer circumferential surface 21 of the inner electrode 10 or the tapered inner circumferential surface 51 of the outer electrode 40.

In addition, when the insulation films 71 are formed on both of the tapered outer circumferential surface 21 of the inner electrode 10 and the tapered inner circumferential surface 51 of the outer electrode 40, the insulation material of the insulation film 71 of the inner electrode 10 may differ from that of the insulation film 71 of the outer electrode 40.

In this case, the insulation layer 70 is formed of a first layer on the tapered outer circumferential surface 21 and a second layer on the tapered inner circumferential surface 51. Since the first layer and the second layer are formed of different insulation materials, for example, even if one layer deteriorates due to a usage environment, it is possible to insulate the inner electrode from the outer electrode owing to the other layer. Therefore, the insulation layer 70 is capable of having redundancy, and exhibiting durability in various environments. In addition, one or a plurality of other layers may be formed between the first layer and the second layer. That is, not only may the first layer and the second layer be in direct contact with each other, but other layers may also be interposed between the first layer and the second layer.

In the embodiments, the insulation films 71 are bonded together through melding in the heating step S5, and thus the inner electrode 10 and the outer electrode 40 are integrated together. However, for example, both of the inner electrode 10 and the outer electrode 40 may be integrated together by an adhesive agent interposed between the insulation films 71 without performing the heating step S5.

In the embodiments, the tapered outer circumferential surface 21 of the inner electrode 10 has the same taper rate as that of the tapered inner circumferential surface 51 of the outer electrode 40, but both may have different taper rates.

In the embodiments, the inner electrode 10 and the outer electrode 40 are formed of the same conductive material, but may be formed of different conductive materials.

In the embodiments, the second inner circumferential surface 93 has the same inner diameter as the outer diameter of the inside-flange outer circumferential surface 32 of the inner electrode 10, and the outer diameter of the outside-flange outer circumferential surface 62 of the outer electrode 40. However, the embodiments are not limited thereto. The inner diameter of the second inner circumferential surface 93 may have a dimension corresponding to the outer diameters of the inside-flange outer circumferential surface 32 and the outside-flange outer circumferential surface 62, specifically, a dimension such that the inside-flange outer circumferential surface 32 or the outside-flange outer circumferential surface 62 can be guided by the second inner circumferential surface 93 in the direction of the axial line O.

The embodiments describe the technique of guiding the inner electrode 10 using the second inner circumferential surface 93 of the guiding tool 90 as a guide surface. Instead, the inner electrode 10 and the outer electrode 40 may be assembled together, for example, by disposing the inner electrode 10 inside the guiding tool 90, subsequently inserting the outer electrode 40 into the guiding tool 90, and guiding the outer electrode 40 using a guide surface.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10: inner electrode
11: first inside end surface
12: second inside end surface
20: columnar portion
21: tapered outer circumferential surface
22: recessed portion
23: inner circumferential surface
24: bottom surface
25: end surface
30: inside flange portion
31: inside flange surface
32: inside-flange outer circumferential surface
33: end surface
40: outer electrode 41: first outside end surface
42: second outside end surface
50: cylindrical portion
51: tapered inner circumferential surface
52: outer circumferential surface
53: end portion
54: end surface
60: outside flange portion
61: outside flange surface
62: outside-flange outer circumferential surface
63: end surface
70: insulation layer
71: insulation film
80: spacer
90: guiding tool
91: inner circumferential surface
92: first inner circumferential surface
93: second inner circumferential surface
94: stepped surface
95: lower surface
100: corrosion sensor
200: corrosion sensor
300: corrosion sensor
S1: inner electrode preparation step
  S2: outer electrode preparation step
S3: insulation material coating step
S4: assembly step
S5: heating step
O: axial line

What is claimed is:

1. A corrosion sensor, comprising:
an inner electrode formed of a conductive material, the inner electrode including a columnar portion having a columnar shape around an axial line as a center thereof and of which an outer circumferential surface is tapered, wherein a diameter of the outer circumferential surface of the columnar portion decreases toward one side in a direction of the axial line;
an outer electrode formed of a conductive material, the outer electrode including a cylindrical portion having a cylindrical shape around the axial line as a center thereof and of which an inner circumferential surface is tapered, wherein a diameter of the inner circumferential surface of the cylindrical portion decreases toward the one side in the direction of the axial line, and the cylindrical portion is positioned such that the inner circumferential surface of the cylindrical portion radially faces the outer circumferential surface of the columnar portion;
an insulation layer formed of an insulation material and in a position across which the outer circumferential surface of the columnar portion faces the inner circumferential surface of the cylindrical portion,
wherein the insulation layer is in contact with the outer circumferential surface of the columnar portion and the inner circumferential surface of the cylindrical portion.

2. The corrosion sensor according to claim 1, wherein the insulation material includes a glass material or a ceramic material.

3. The corrosion sensor according to claim 1, wherein the insulation layer includes a first insulation layer on the outer circumferential surface of the columnar portion, and a second insulation layer on the inner circumferential surface of the cylindrical portion,
wherein the insulation material includes a first insulation material forming the first insulation layer and a second insulation material forming the second insulation layer, and
wherein the first insulation material differs from the second insulation material.

4. The corrosion sensor according to claim 1,
wherein the inner electrode further includes an inside flange portion protruding radially outward from the columnar portion,
wherein the outer electrode further includes an outside flange portion protruding radially outward from the cylindrical portion, and facing the inside flange portion from the one side in the direction of the axial line, and
wherein the corrosion sensor further comprises a spacer configured to be brought into contact with the inside flange portion and the outside flange portion.

5. The corrosion sensor according to claim 1,
wherein the columnar portion has a recessed portion which is recessed from a surface of the columnar portion on another side in the direction of the axial line, and
wherein an inner circumferential surface of the recessed portion is positioned inside the outer circumferential surface of the columnar portion in a radial direction of the columnar portion.

6. The corrosion sensor according to claim 1,
wherein the insulation material includes a glass material and a ceramic material.

7. A corrosion sensor, comprising:
an inner electrode formed of a conductive material, the inner electrode including a columnar portion having a columnar shape around an axial line as a center thereof and of which an outer circumferential surface is tapered, wherein a diameter of the outer circumferential surface of the columnar portion decreases toward one side in a direction of the axial line;
an outer electrode formed of a conductive material, the outer electrode including a cylindrical portion having a cylindrical shape around the axial line as a center thereof and of which an inner circumferential surface is tapered, wherein a diameter of the inner circumferential surface of the cylindrical portion decreases toward the one side in the direction of the axial line, and the cylindrical portion is positioned such that the inner circumferential surface of the cylindrical portion radially faces the outer circumferential surface of the columnar portion;
a first insulation layer formed of a first insulation material; and
a second insulation layer formed of a second insulation material,
wherein the first insulation layer is on the outer circumferential surface of the columnar portion and the second insulation layer is on the inner circumferential surface of the cylindrical portion, and
wherein the first insulation material differs from the second insulation material.

* * * * *